(12) United States Patent
Patton et al.

(10) Patent No.: US 7,249,878 B2
(45) Date of Patent: Jul. 31, 2007

(54) MULTI-LAYER ILLUMINATED PACKAGE

(75) Inventors: David L. Patton, Webster, NY (US); Robert P. Bourdelais, Pittsford, NY (US); Cheryl J. Kaminsky, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 313 days.

(21) Appl. No.: 10/340,485

(22) Filed: Jan. 10, 2003

(65) Prior Publication Data

US 2004/0136171 A1 Jul. 15, 2004

(51) Int. Cl.
*F21V 11/00* (2006.01)
*G02B 5/02* (2006.01)

(52) U.S. Cl. ............ 362/558; 362/355; 362/618; 362/620; 359/707

(58) Field of Classification Search ............ 362/31, 362/551, 583, 558, 559, 600, 617, 618, 620; 359/707, 599, 626, 454
See application file for complete search history.

(56) References Cited

U.S. PATENT DOCUMENTS

| | | | |
|---|---|---|---|
| 2,634,530 A | 4/1953 | Herschede et al. | |
| 4,927,036 A | 5/1990 | Pojedinec | |
| 5,369,419 A | 11/1994 | Stephenson et al. | |
| 5,852,514 A | 12/1998 | Toshima et al. | |
| 6,020,823 A | 2/2000 | DeCicco | |
| 6,079,844 A | 6/2000 | Whitehead et al. | |
| 6,174,072 B1 | 1/2001 | Root, Jr. | |
| 6,802,635 B2 * | 10/2004 | Robertson et al. | 362/555 |
| 6,867,927 B2 * | 3/2005 | Bourdelais et al. | 359/707 |
| 2003/0214719 A1 * | 11/2003 | Bourdelais et al. | 359/599 |
| 2004/0037091 A1 * | 2/2004 | Guy | 362/582 |
| 2004/0066659 A1 * | 4/2004 | Mezei et al. | 362/555 |
| 2004/0141302 A1 * | 7/2004 | Koch et al. | 362/31 |

FOREIGN PATENT DOCUMENTS

| | | |
|---|---|---|
| WO | 0043815 | 7/2000 |
| WO | 0150444 | 7/2001 |
| WO | 0171248 | 9/2001 |

* cited by examiner

*Primary Examiner*—Jong-Suk (James) Lee
*Assistant Examiner*—Jacob Y. Choi
(74) *Attorney, Agent, or Firm*—Frank Pincelli

(57) ABSTRACT

A sheet of material and package made using the sheet of material. The sheet of material having an having an outer diffuse layer and an inner light piping layer adjacent the diffuse layer. The sheet transmits light to the outer surface of the outer diffuse layer. The outer diffuse layer has a specular area formed thereon through which light from the light piping layer can exit in a substantially non-diffuse manner from the outer surface of the outer diffuse layer.

31 Claims, 7 Drawing Sheets

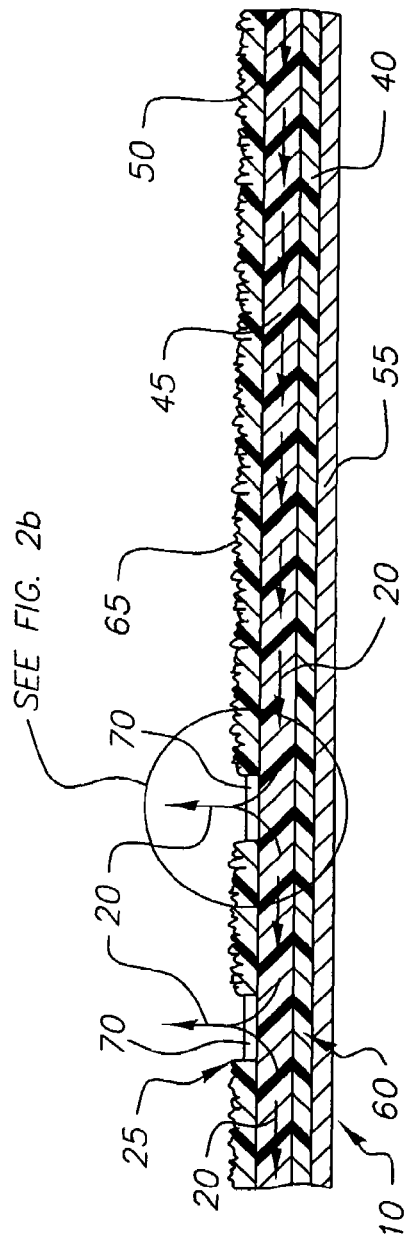
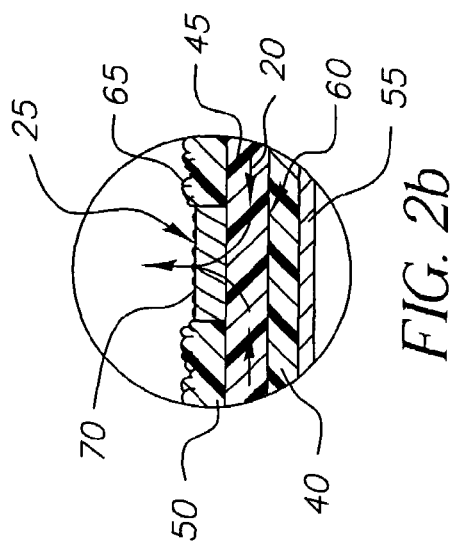

MULTI-LAYER ILLUMINATED PACKAGE

FIELD OF THE INVENTION

This invention relates to multi-layer packaging that transmits light through the package layers to illuminate portions of the printed area.

BACKGROUND OF THE INVENTION

When designing a package, one of the most important features is the package's ability to attract the attention of the shopper. Since most products are displayed on the retailer's shelf, the package must be able to catch the eye of the potential buyer by distinguishing your product's package from the others. This is usually accomplished by using a colorful label or a colorful and unique packaging material.

U.S. Pat. No. 6,020,823 discloses a package wrap for decoratively covering a container having sidewalls. A flexible thin sheet of polymeric material is adapted to be shrink-wrapped onto the exterior walls of the container. An illuminating device is positioned between the flexible thin polymeric sheet and the exterior of the container so that when the polymeric sheet is shrink-wrapped onto the container the illuminating device will be held securely in place.

U.S. Pat. No. 2,634,530 discloses an illuminated sign where the edge of the sign is illuminated.

U.S. Pat. No. 5,852,514 (Toshima et al.) describes a light-diffusing element comprising a light diffusion layer including acrylic resin and spherical particles of polymethyl methacrylate on a transparent support. Whereas this film would diffuse the light efficiently, the polymers used have high glass transmission temperatures and would therefore be difficult to melt the spherical particles completely to create areas of specular transmission. When illuminated these not completely melted lenses would diffuse a portion of the light lowering the brightness of the printed, more specular areas and thus lowering contrast of the overhead illuminated image.

U.S. Pat. No. 5,369,419 (Stephenson et al.) describes a thermal printing system where the amount of gloss on a media can be altered. The method uses heat to change the surface properties of gelatin, which has many disadvantages. Gelatin cannot achieve high roughness averages, thereby having a low distinction between the matte and glossy areas of the media. This small distinction between the matte and glossy states leads to a low signal to noise ratio and when illuminated, creates lower contrast ratios. Gelatin also is very delicate, scratch prone, and self-healing, and so it tends to flow over time thus changing its surface roughness and other properties with time especially in high humidity and heat, and is dissolved if placed in water. Also, gelatin has a native yellow color, is expensive, and is tacky, sticking to other sheets and itself. It would be desirable to use a material that had no coloration, is more stable in environmental conditions, and could have a higher surface roughness.

When businesses advertise, they use colorfully lighted signs to attract the attention of customers. It would be very advantageous to be able to have individual packages light up in a similar fashion to a colorfully lighted sign. The problem is the ease adding this feature to existing packages. One can add illuminated devices and miniature lights to the package but these require power sources and are relatively expensive. These are also fragile and susceptible to damage.

Another technique used to illuminate products such as liquids in translucent bottles is to place these on a lighted shelf and use the transmissive properties of the light and the bottle to illuminate the product.

The problem with existing packaging is that it is not easily and inexpensively illuminated other than shinning a light directly on the package, which does nothing to distinguish it from its neighbor. The same is true for placing bottled products on a lighted shelf.

To solve the problems of the prior art what is need is a packaging material that can pipe light from a lighted surface to selectively illuminate portions of a package. Using light diffusing elements that are flattened with exposure to heat and/or pressure, a high contrast image can be obtained where the printed areas (flattened light diffusing elements) are bright and the non-imaged areas are dark. This increased contrast between the printed and non-printed areas allows portion of the package containing the printed material to be brightly illuminated. Not only can the imaged areas be bright, but they can also be colored producing projected images of text, images, shapes, and pictures with many colors on a darker background.

SUMMARY OF THE INVENTION

In accordance with one aspect of the present invention there is provided an article made from a sheet of material having an inner surface and an outer surface, the sheet having an outer diffuse layer and an inner light piping layer adjacent the diffuse layer, the sheet transmits light to the outer surface of the outer diffuse layer, the outer diffuse layer having a specular area formed thereon through which light from the light piping layer can exit in a substantially non-diffuse manner from the outer surface of the outer diffuse layer.

In accordance with another aspect of the present invention there is provided a method for producing a light transmitting package, comprising the steps of:

providing a sheet material having an inner surface and an outer surface, the sheet having an outer diffuse layer and an inner light piping layer adjacent the diffuse layer, the sheet transmits light to the outer surface of the outer diffuse layer, the outer diffuse layer having a specular area formed thereon through which light from the light piping layer can exit in a substantially non-diffuse manner from the outer surface of the outer diffuse layer; and forming the sheet into the package so that at least an edge of the light piping layer is exposed for allowing light to enter the light piping layer.

In accordance with yet another aspect of the present invention there is provided a method for displaying a package, comprising the steps of:

providing a package made of a sheet material having an inner surface and an outer surface, the sheet having an outer diffuse layer and an inner light piping layer adjacent the diffuse layer, the sheet transmits light to the outer surface of the outer diffuse layer, the outer diffuse layer having a specular area formed thereon through which light from the light piping layer can exit in a substantially non-diffuse manner from the outer surface of the outer diffuse layer, the package is constructed so that at least an edge of the light piping layer is exposed for allowing light to enter the light piping layer; and exposing the edge of the light piping layer to a light source.

In accordance with still another aspect of the present invention there is provide a sheet of material having an inner surface and an outer surface, the sheet having an outer diffuse layer and an inner light piping layer adjacent the diffuse layer, the sheet transmits light to the outer surface of the outer diffuse layer, the outer diffuse layer having a specular area formed thereon through which light from the light piping layer can exit in a substantially non-diffuse manner from the outer surface of the outer diffuse layer.

These and other aspects, objects, features and advantages of the present invention will be more clearly understood and appreciated from a review of the following detailed description of the preferred embodiments and appended claims and by reference to the accompanying drawings.

BRIEF DESCRIPTION OF THE DRAWINGS

In the detailed description of the preferred embodiments of the invention presented below, reference is made to the accompanying drawings in which:

FIG. 2a is a partial cross-sectional view of a sheet of illuminated packaging material used to make the package of FIG. 1;

FIG. 2b is an enlarged partial view of a portion of the sheet of illuminated packaging material of FIG. 2a illustrating areas where the collection lens have been formed;

FIG. 5 is a view similar to FIG. 3 illustrating another embodiment of a cross section of a component of the sheet of illuminated packaging material of FIG. 2a;

DETAILED DESCRIPTION OF THE INVENTION

Figure 1:
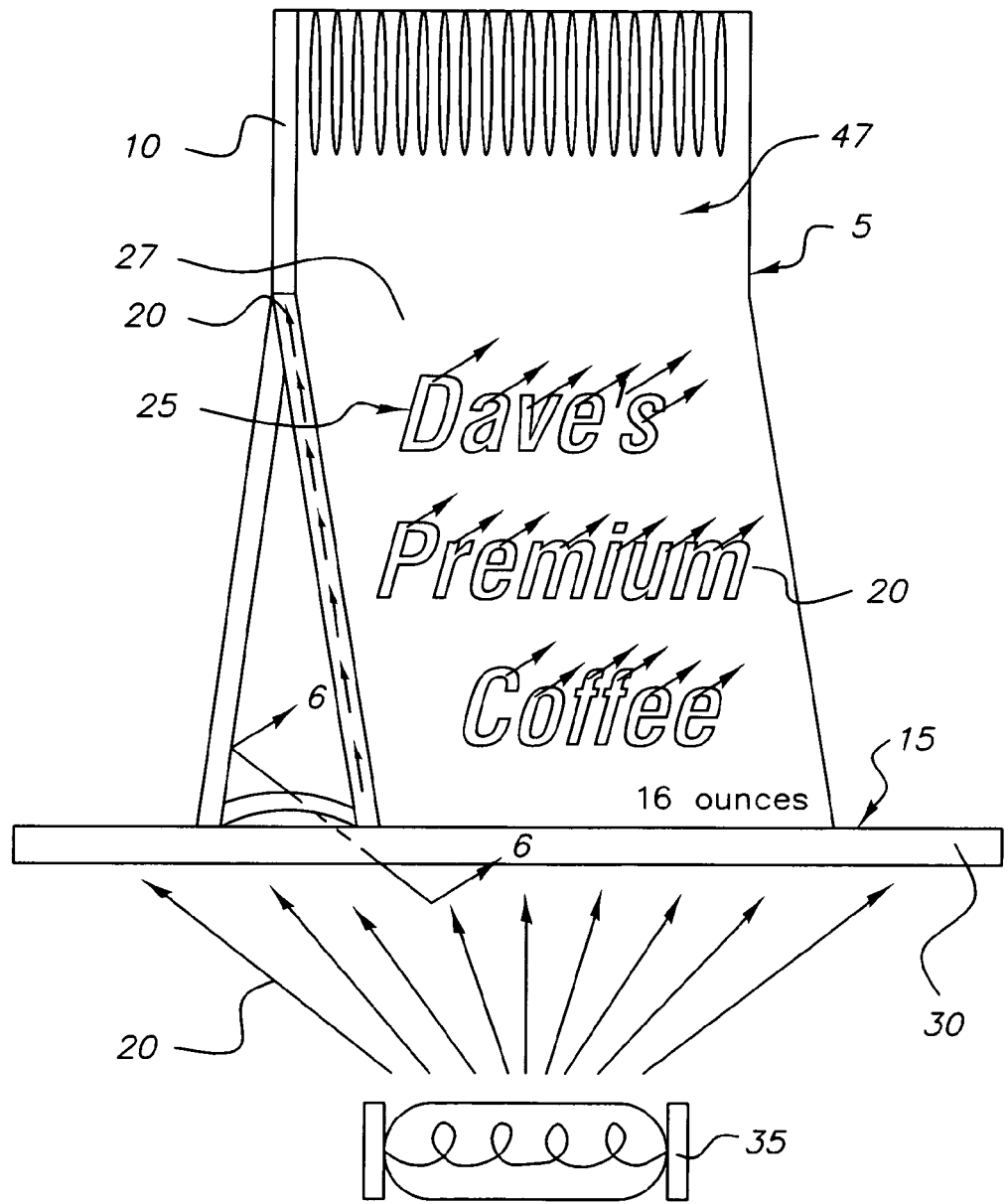
FIG. 1 is a perspective view of a multi-layer illuminated package made in accordance with the present invention placed on a lighted surface.

A multi-layer illuminated package 5 made in accordance with the present invention using a multi-layer illuminated packaging material 10 is illustrated in FIG. 1.

When the multi-layer illuminated package 5 is placed on a lighted surface 15, light 20 is piped from the lighted surface 15 through multi-layer illuminated packaging material 10 and exits specularly in the specular area 25 and exits diffusely through the diffuse area 27. The "specular area" of the multi-layer illuminated package 5 is defined as where most of the light passing through that area of the multi-layer illuminated packaging material 10 is transmitted specularly (substantially not diffused) and therefore that area of the package appears bright. The "diffuse area" of the multi-layer illuminated package 5 is defined as where most of the specular light is diffused causing that area of the package to appear darker than the specular areas. In the package 5 shown in FIG. 1 the specular area 25 can be a product name such as "Dave's Premium Coffee" where the light 20 is emitted lighting the product name. It is understood that the specular area 25 can also be used to create specular dots, lines, patterns, and text. The lighted surface 15 in this embodiment comprises a sheet 30 of translucent material such as opal Plexiglas mounted over a light source 35 such as a fluorescent light.

Referring to FIG. 2a, there is illustrated a partial cross-sectional view of a sheet of illuminated packaging material 10 used to make the package 5 of FIG. 1. The sheet of multi-layer material 10 comprises an optional substrate (inner support layer) 40 for providing strength and support. In the particular embodiment illustrated, the substrate 40 is a biaxially oriented polymer, for example, polyester. Over substrate 40 there is provided a light-piping layer 45 such as polyethylene. Over the light-piping layer 45 there is a diffuser layer 50 comprised of a polymeric film. In one embodiment of the present invention an additional inner layer 55 maybe used to protect the contents of the package. For example, the package might contain a food product in which case the inner would be made of a material that is inert to the food product. The inner layer may also be used to protect the package contents form oxygen, moisture, light etc. In the primary embodiment of the present invention the inner layer is not required.

Light 20 as indicated by arrows is piped along the light-piping layer 45. The outer surface 60 of the substrate 40 prevents the light from escaping into the package, while the diffuser layer 50 diffuses the light out from the outer surface 47 of the package 5. The diffuser layer 50 is made up light shaping elements 65. Specular areas 25 where light 20 is to be emitted are formed in the diffuser layer 25 by flattening the light shaping elements 65 using heat and/or pressure to form collection lenses 70.

FIG. 2b is an enlarged portion of the sheet of illuminated packaging material 10 of FIG. 2a illustrating diffuse areas 27 and specular areas 25 where the collection lens 70 have been formed. As previously discussed in FIG. 2a like numerals indicate like parts and operations. The diffuse layer 50 of the multi-layer packaging material 10 can be altered using heat and/or pressure to provide the specular area 25. The process consists of using heat and/or pressure in a gradient or pattern to produce a variable light shaping areas on the multi-layer packaging material 10. The process for producing diffuse 27 and specular areas 25 in a polymer material is described in U.S. pending patent application entitled INCREASED CONTRAST OVERHEAD PROJECTION FILMS, of Cheryl J. Kaminsky and Robert Paul Bourdelais, U.S. Ser. No. 10/279,599, filed Oct. 24, 2002 which is hereby incorporated in its entirety by reference. One device 200 which can be used for creating the collection lenses 70 is described in FIG. 4. When heat and/or pressure is applied to the multi-layer packaging material 10, the light-shaping element 65 partially or fully melts, flows, and cools to form the collection lenses 70 where most or all of the light-shaping element 65 is flattened The diffusing layer 50 contains light-shaping elements 65 that diffuse visible light in transmission and can be on the surface of the diffusing layer 50 or in the diffusing layer 50. The light-shaping elements in their diffuse form work by deflecting the light as it passes from one index of refraction material to another and passing through an interface that is not normal to the light. The greater the change in index of refraction or the greater the angle of the interface to the light the greater the amount of deflection (and diffusion). When the light-shaping elements in their diffuse form are flattened with heat and or pressure there is less or no curvature to the light-shaping elements and the light passes through the index of refraction change with little change to its course (and are therefore mostly specular).

Figure 3A:
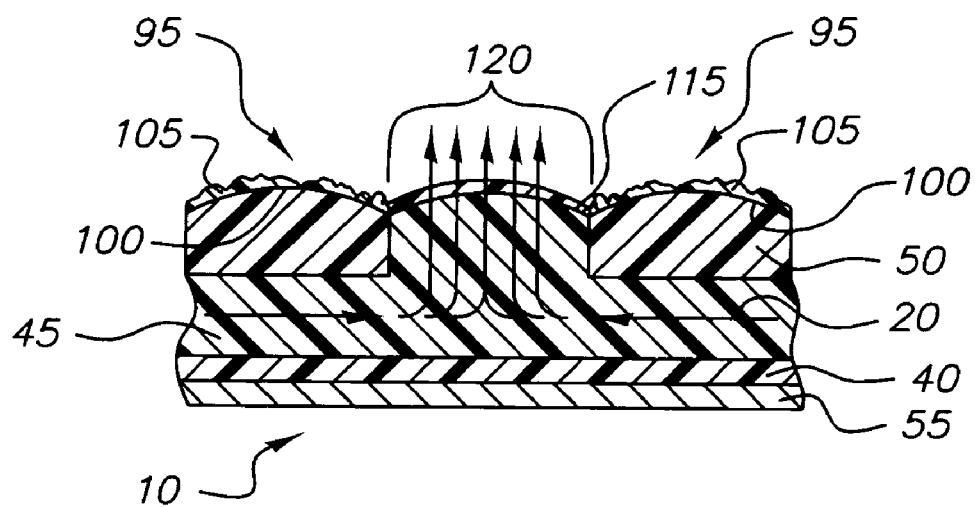
FIG. 3a is a view similar to FIG. 2b illustrating another embodiment of a portion of the sheet of illuminated packaging material of FIG. 2b.

FIG. 3a illustrates another embodiment of a portion of the sheet of illuminated packaging material 10 of FIG. 2b. In this embodiment the light diffuser layer 50 is made up of complex lenses 95 in the form of a plurality of random micro-lenses, or lenslets. The term "lenslet" means a small lens. The lenslets overlap to form complex lenses 95. "Complex lenses" means a major lens 100 having on the surface thereof multiple minor lenses 105. "Major lenses" mean larger lenslets that the minor lenses 105 are formed randomly on top of. "Minor lenses" mean lenses smaller than the major lenses that are formed on the major lenses 100. Heat and/or pressure is used to melt the minor lenses 105 (which are preferably made up of thermoplastic) and the major lens 100 to reform to create newly shaped collection lenses 115 that are shallower than the original lenses 105. These collection lenses 115 allow light to pass through the printed areas 120 specularly. Using this technique heat and/or pressure is a way to selectively turn parts of the diffuse light diffuser layer 50 of the multi-layer packaging material 10 into partially diffuse or specular areas 25 of the multi-layer packaging material 10 and can be applied in a very precise way to create specular dots, lines, patterns, text, and images.

Figure 3B:
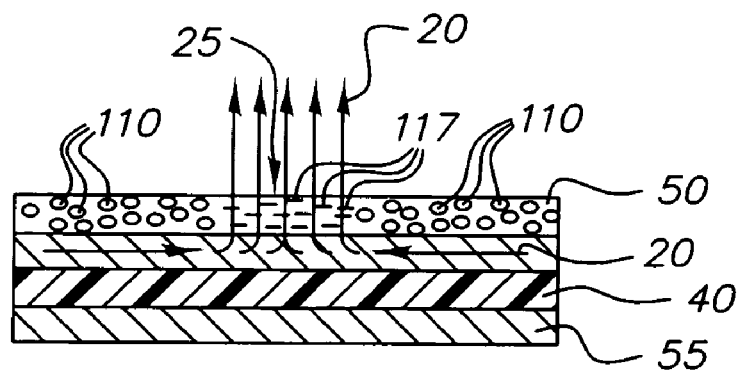
FIG. 3b is a view similar to FIG. 2b illustrating yet another embodiment of a portion of the sheet of illuminated packaging material of FIG. 2b.

In yet another embodiment illustrated by FIG. 3b, heat and/or pressure applied to the light diffuser layer 50 with voided polymer comprised of voids 110 will melt the polymer and create closed voids 117 to the extent at which the heat is applied. The closed voids 117 can be partially melted and less diffuse, or melted completely creating a specular area 25 similarly to the way the minor lenses 105 are melted to form collection lenses 115.

Figure 4:
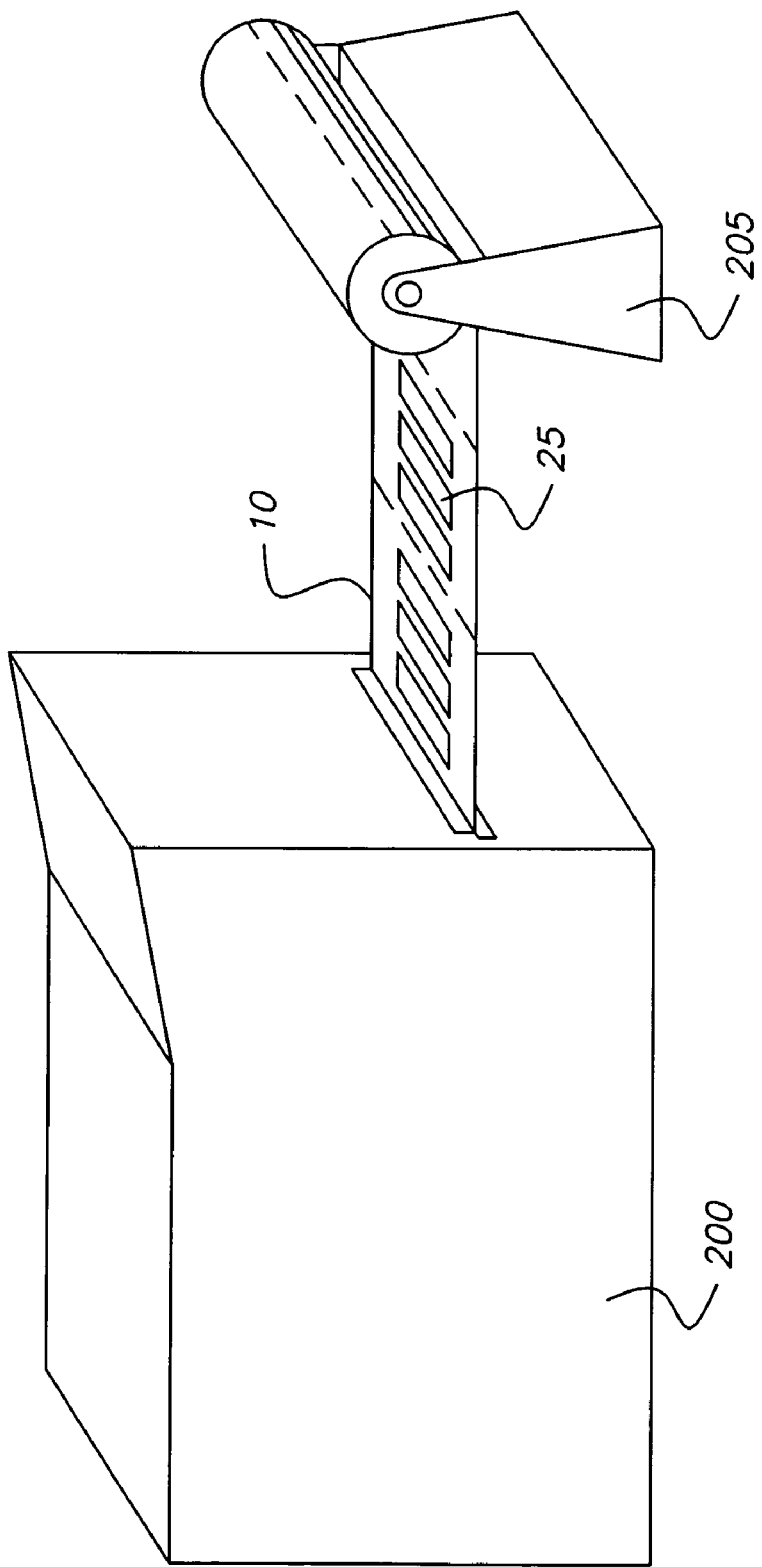
FIG. 4 is a schematic view of a device used to produce the illuminated package of FIG. 1 made in accordance with the present invention.

Now referring to FIG. 4, there is illustrated a device 200 for using the material 10 of FIG. 2a. In the embodiment illustrated device 200 is a thermal printing system such as a KODAK PROFESSIONAL ML-500 Photo Print System available today. The resistive thermal head (not shown), found in the KODAK PROFESSIONAL ML-500 Photo Print System, uses heat and pressure to melt the light shaping elements 65 to create areas 25 of specular transmission. As the printer prints, the printer head heats the sheet of illuminated packaging material 10 and supplies pressure to deform or completely melt the light shaping elements 65. This process is preferred because it has accurate resolution, can create clear areas or add color at the same time as melting the light shaping elements 65, and uses heats and pressures to melt a range of polymers. The resolution of the areas of light shaping, semi-light shaping and specular depends on the resolution of the print head. In the embodiment shown the packaging material 10 is taken up on a wind up device 205 so it can later be cut into the correct package shape.

Figure 5:
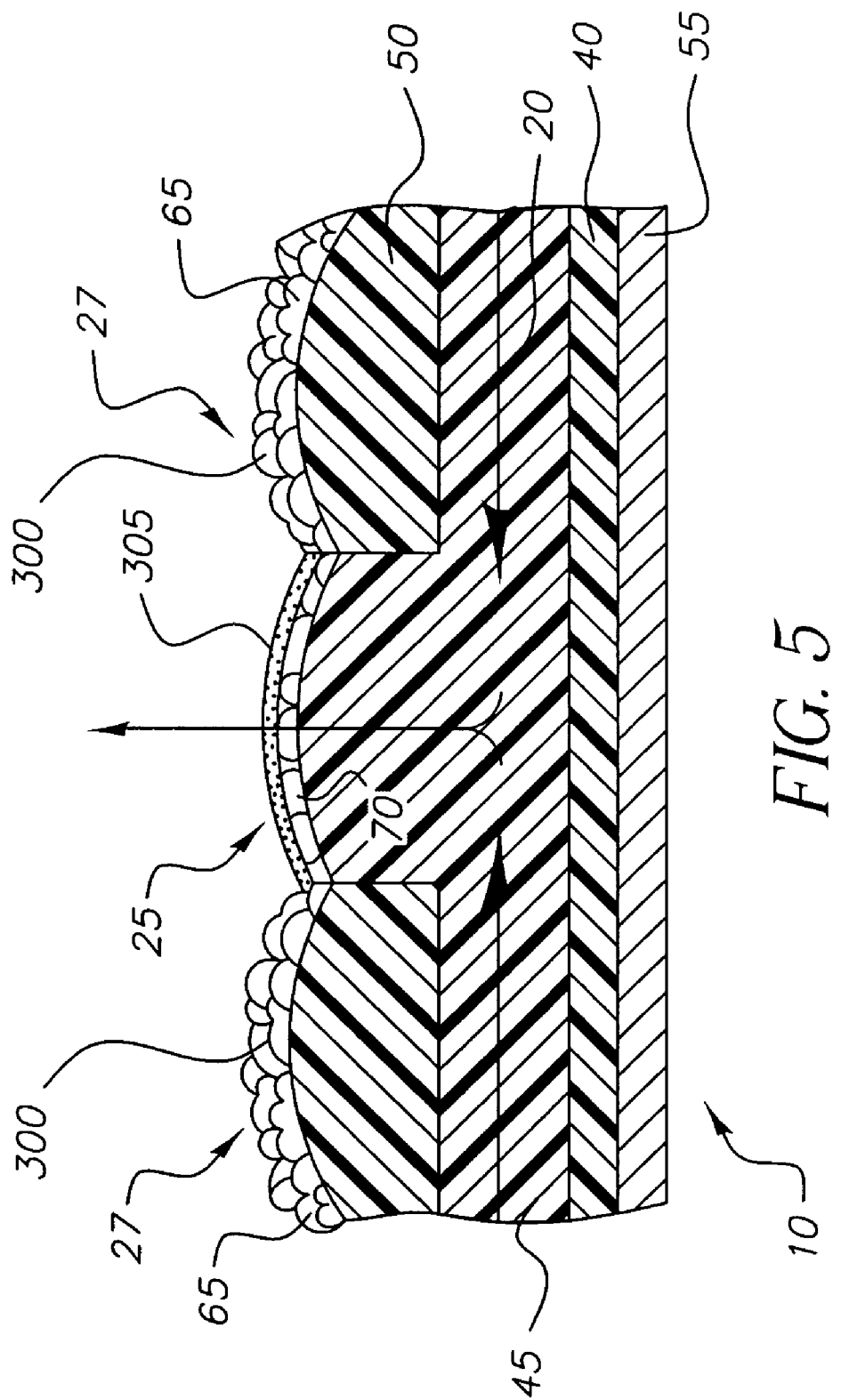

In another embodiment, preferably color may be added to the areas 25 of specular transmission. A film with colorant receiving layer is described in U.S. pending patent application entitled LIGHT MANAGEMENT FILM WITH COLORANT RECEIVING LAYER, of Robert Paul Bourdelais, Cheryl J. Kaminsky and Eric Eugene Arrington, U.S. Ser. No. 10/279,557, filed Oct. 24, 2002 which is hereby incorporated in its entirety by reference.

the contents of which are incorporated herein by reference. FIG. 5 illustrates a cross section of the multi layer packaging material 10 that comprises the light piping material 45, light shaping elements 65 and a layer 300 capable of receiving a dye density of at least 0.5 before printing. The light piping material 45 has light shaping elements 65 on the surface. The light diffuser layer 50 has a dye-receiving layer 300 on the surface of the light shaping elements 65. When printing the sheet of illuminated packaging material 10 and creating areas 25 of specular transmission, color is added so that the specular areas 25 are colored. Transferring color while creating specular areas 25 is advantaged because multiple colors can be added to each sheet of packaging material 10. The color added is preferably a dye because dyes are transparent so the colored areas 305 show up bright and colored, increasing the contrast between the printed or specular area 25 and non-printed or diffuse areas 27. Furthermore, dyes are easily added at the same time the specular areas 25 are created using dyes that sublimate and a thermal printer. This is advantaged because there are no registration issues between the areas of color (with dye) and the areas 25 of specular transmission because they are created at the same time using a printing technique that is inexpensive and already supported by the printing industry. Preferably, the sheet of illuminated packaging material 10 with light shaping efficiency variation can create patterns, text, and pictures by diffusing light selectively to create areas of diffusion, less diffusion, and no diffusion (specular). This enables the creation of visually interesting and eye catching images.

Figure 6:
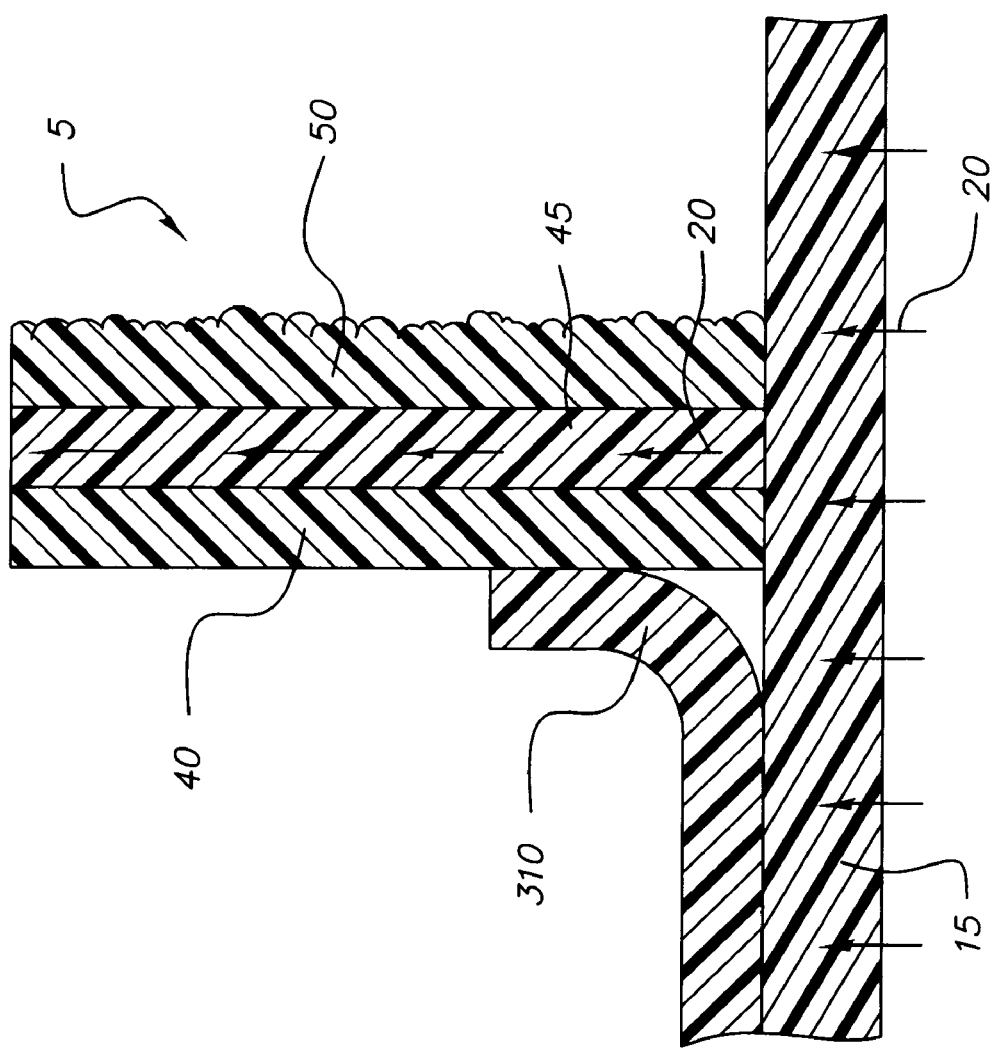
FIG. 6 is a schematic cross-sectional views of the package of FIG. 1 as taken along line 6-6 of FIG. 1.

Referring to FIG. 6, there is illustrated a cross-sectional view of the package 5 as taken along line 6-6 of FIG. 1 made in accordance with the present invention. As previously discussed in FIG. 1 like numerals indicate like parts and operations. In the embodiment shown in FIG. 6, package 5 is constructed so that an edge 310 the light-piping layer 45 is left exposed to allow the light 20 from the surface 15 the enter the light-piping layer 45. The bottom piece 315 of the package 5 is attached to the substrate 40 so the edge 310 of light-piping layer 45 is not blocked. In the embodiment shown light enters through the bottom edge 315. In another configuration light may enter through any unblocked edge of the light-piping material 45.

Figure 7:
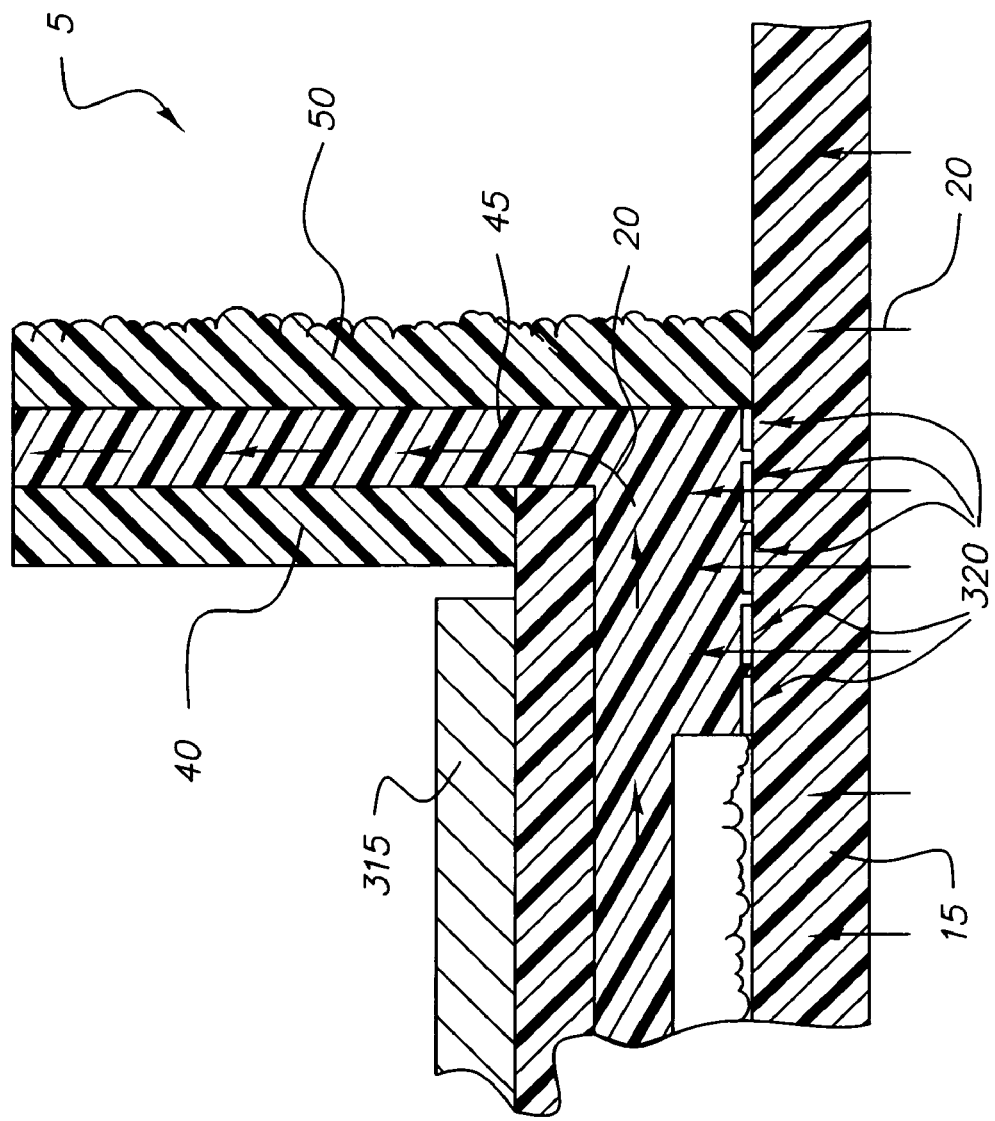
FIG. 7 is a schematic cross-sectional view of yet another embodiment of the package of FIG. 1.

Referring to FIG. 7, there is illustrated a cross-sectional view of another embodiment of package 5 made in accordance with the present invention. As previously discussed in FIG. 6 like numerals indicate like parts and operations. In the embodiment shown in FIG. 7, package 5 is constructed so that the multi-layer packaging material 10 wraps under the bottom piece 315. In order to let light reach the light-piping layer 45 collection lens 320 are formed in the diffuse layer 50 allowing the light 20 from the surface 15 to enter the light-piping layer 45 specularly. The invention has been described in detail with particular reference to certain preferred embodiments thereof, but it will be understood that variations and modifications can be effected within the scope of the invention.

PARTS LIST 5 multi-layer illuminated package
10 multi-layer material
15 lighted surface
20 light
25 specular area
27 diffuse area
30 sheet
35 light source
40 substrate/inner support layer
45 light-piping layer
47 outer surface
50 diffuser layer
55 inner layer
60 outer surface
65 light shaping elements
70 collection lenses 95 complex lenses
100 major lenses
105 minor lenses
110 voids
115 collection lenses
117 closed voids
120 printed areas
200 device
205 wind up device
300 layer
305 colored areas
310 edge
315 bottom piece
320 collection lens

What is claimed is:

1. An article made from a sheet of material having an inner surface and an outer surface, said sheet having an outer diffuse layer formed by a plurality of complex lenses and an inner light piping layer adjacent said diffuse layer, said sheet transmits light to the outer surface of said outer diffuse layer, said outer diffuse layer having a specular area formed thereon through which light from said light piping layer can exit in a substantially non-diffuse manner from the outer surface of said outer diffuse layer.

2. An article according to claim 1 wherein an inner support layer is provided adjacent said inner light piping layer.

3. An article according to claim 2 wherein said inner support layer is made of a biaxially oriented polymer.

4. An article according to claim 3 wherein said inner support layer is made of polyester.

5. An article according to claim 2 wherein an inner protective layer is provided inwardly of said inner support layer, said inner protective layer protects contents of said article.

6. An article according to claim 1 wherein an inner protective layer is provided inwardly of said inner light piping layer, said inner protective layer protects contents of said article.

7. An article according to claim 6 wherein said inner protective layer protects the contents from oxygen, moisture or light.

8. An article according to claim 1 wherein said outer diffuse layer is made of a polymeric film.

9. An article according to claim 1 wherein said light piping layer is made polyethylene.

10. An article according to claim 1 wherein a color receiving layer is provided for providing a color to the light that exits said specular areas.

11. An article according to claim 10 wherein said color receiving layer is provided over said outer diffuse layer.

12. An article according to claim 1 wherein an edge of light piping material is provided for exposure to a light source.

13. An article according to claim 1 wherein said article comprises a package.

14. A method for producing a light transmitting package, comprising the steps of:

providing a sheet material having an inner surface and an outer surface, said sheet having an outer diffuse layer formed by a plurality of complex lenses and an inner light piping layer adjacent said diffuse layer, said sheet transmits light to the outer surface of said outer diffuse layer, said outer diffuse layer having a specular area formed thereon through which light from said light piping layer can exit in a substantially non-diffuse manner from the outer surface of said outer diffuse layer; and forming said sheet in to said package so that at least an edge of said light piping layer is exposed for allowing light to enter said light piping layer.

15. A method for displaying a package, comprising the steps of:

providing a package made of a sheet material having an inner surface and an outer surface, said sheet having an outer diffuse layer formed by a plurality of complex lenses and an inner light piping layer adjacent said diffuse layer, said sheet transmits light to the outer surface of said outer diffuse layer, said outer diffuse layer having a specular area formed thereon through which light from said light piping layer can exit in a substantially non-diffuse manner from the outer surface of said outer diffuse layer, said package is constructed so that at least an edge of said light piping layer is exposed for allowing light to enter said light piping layer; and exposing said edge of said light piping layer to a light source.

16. A sheet of material having an inner surface and an outer surface, said sheet having an outer diffuse layer formed by a plurality of complex lenses and an inner light piping layer adjacent said diffuse layer, said sheet transmits light to the outer surface of said outer diffuse layer, said outer diffuse layer having a specular area formed thereon through which light from said light piping layer can exit in a substantially non-diffuse manner from the outer surface of said outer diffuse layer.

17. A sheet of material according to claim 16 wherein said outer diffuse layer comprises a plurality of complex lens.

18. A sheet of material according to claim 16 wherein said outer diffuse layer comprises a plurality of lenslets.

19. A sheet of material according to claim 16 wherein an inner support layer is provided adjacent said inner light piping layer.

20. A sheet of material according to claim 19 wherein said inner support layer is made of a biaxially oriented polymer.

21. A sheet of material according to claim 20 wherein said inner support layer is made of polyester.

22. A sheet of material according to claim 19 wherein an inner protective layer is provided inwardly of said inner support layer, said inner protective layer protects contents of said article.

23. A sheet of material according to claim 16 wherein an inner protective layer is provided inwardly of said inner light piping layer, said inner protective layer protects contents of said article.

24. A sheet of material according to claim 23 wherein said inner protective layer protects the contents from oxygen, moisture or light.

25. A sheet of material according to claim 16 wherein said outer diffuse layer is made of a polymeric film.

26. A sheet of material according to claim 16 wherein said light piping layer is made polyethylene.

27. A sheet of material according to claim 16 wherein a color receiving layer is provided for providing a color to the light that exits said specular areas.

28. A sheet of material according to claim 27 wherein said color receiving layer is provided over said outer diffuse layer.

29. A sheet of material according to claim 16 wherein an edge of light piping material is provided for exposure to a light source.

30. A sheet of material according to claim 16 wherein said article comprises a package.

31. An article made from a sheet of material having an inner surface and an outer surface, said sheet having an outer diffuse layer formed by a plurality of lenslets and an inner light piping layer adjacent said diffuse layer, said sheet transmits light to the outer surface of said outer diffuse layer, said outer diffuse layer having a specular area formed thereon through which light from said light piping layer can exit in a substantially non-diffuse manner from the outer surface of said outer diffuse layer.

* * * * *